April 21, 1970 J. M. BROWNLOW ET AL 3,508,219
THIN FILM MEMORY KEEPER
Filed Jan. 13, 1967
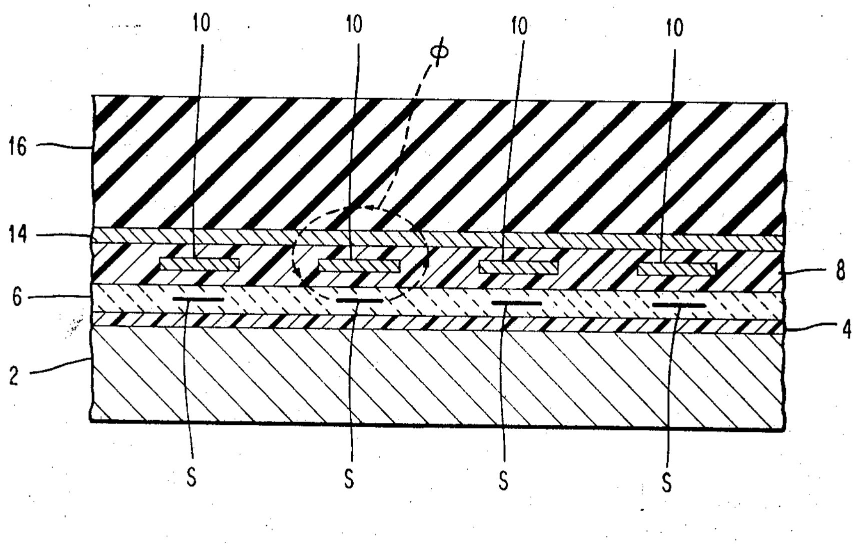
INVENTORS
JAMES M. BROWNLOW
KURT R. GREBE
BY [signature]
ATTORNEY United States Patent Office 3,508,219

Patented Apr. 21, 1970

3,508,219
THIN FILM MEMORY KEEPER

James M. Brownlow, Crompond, and Kurt R. Grebe, Beacon, N.Y., assignors to International Business Machines Corporation, Armonk, N.Y., a corporation of New York Filed Jan. 13, 1967, Ser. No. 609,142
Int. Cl. C04b *35/26;* G11c *11/14;* H01f *10/06*
U.S. Cl. 340—174 4 Claims

ABSTRACT OF THE DISCLOSURE

A thin film memory matrix operated by coincident current selection has its switching characteristics improved by employing a novel flexible keeper in conjunction with such matrix. The novel flexible keeper and its method of manufacture make up the inventive contribution.

BACKGROUND OF THE INVENTION

Keepers are employed with flat film memory configurations in that they provide increased sense-line data signal outputs and prevent interbit flux interference. In general, a thin ferromagnetic film is used as a memory plane and contains discrete areas that are magnetizable for purposes of storing binary information. Disposed over but insulated from each column of discrete areas is a bit drive line which, when carrying current, provides a magnetic field that affects such areas. Orthogonal to and above the bit lines are word drive lines that are insulated from the bit drive lines and which, when carrying current, provide magnetic fields that affect rows of discrete areas. A ground plane supports the entire memory plane and provides a ground return for all drive lines, word lines and sense lines used in the operation of the memory plane. A flexible keeper placed atop of the word lines conforms to the shape of the word lines and prevents or diminishes interbit flux interference but also avoids stresses on the magnetic storage film, the latter's magnetic properties being very sensitive to changes in stress applied thereto.

The following are the general requirements for a keeper:

(1) The permeability should be high so as to provide a low reluctance path for flux in the immediate vicinity of the drive lines of a memory matrix.

(2) The coercive force Hc and the remanent flux Br should be small so that there is no stored flux that will be confused with that stored in the magnetized bit in a memory matrix.

(3) The keeper should be capable of conforming itself as close as possible to the film elements serving as storage bits.

(4) The keeper should be flexible or rubberlike and absorb forces that otherwise would be transmitted to the stress-sensitive storage bits.

SUMMARY OF THE INVENTION

The present invention employs a flexible magnetic keeper having large crystallites of high permeability material imbedded in a resinous or rubbery material. Such keeper will have high permeability but no remanence. The flexibility of the magnetic keeper will avoid the deleterious effects of applying stress to a thin magnetic film.

Consequently, it is an object of this invention to provide an improved thin magnetic film memory.

It is yet another object to attain such improved thin film memory by employing a novel magnetic keeper.

The foregoing and other objects, features and advantages of the invention will be apparent from the following more particular description of preferred embodiments of the invention, as illustrated in the accompanying drawing.

BRIEF DESCRIPTION OF THE DRAWING

The sole figure is a showing of the use of a novel keeper with a thin film memory plane.

DESCRIPTION OF THE PREFERRED EMBODIMENTS

The sole figure represents a generalized thin film memory plane for which the keeper of the present invention is applicable. A ground plane 2 is made of copper or similar electrically conducting material over which is deposited a thin film 4 of insulation such as silicon monoxide, polyimide resin, etc. Superimposed on insulation 4 is a permalloy film 6 capable of retaining flux at discrete spots *s* within the plane of the film. A second insulating layer 8 is lain over the magnetic storage film 6 and embedded in such layer 8 are a parallel group of bit drive lines 10 that are designed to carry current for the purpose of applying a magnetic field to a discrete spot *s*. Above insulation 8 is a word line 14 which is orthogonal to bit drivers 10 and such word line is associated with a row of discrete magnetic bit spots *s*. Lying over the word lines 14 is a flexible keeper 16.

As is seen in the sole figure, without the magnetic keeper 16, the flux path of the magnetic field $\phi$ would go through the air above the word drive lines 14, the air path providing a relatively high reluctance path during the recording of information in the memory plane 6. Because of such high reluctance, greater driving currents in the word and bit drivers are needed to switch a given bit spot. A keeper serves as a low reluctance path and confines the magnetic flux $\phi$ close to the memory spot 5 being recorded.

TABLE I

[Construction of the Keeper 16]

| Oxide | Mol percent | Weight (grams) | Atom Parts ($Ni_xZn_yFe_{3-x-y}O_4$) |
|---|---|---|---|
| $Fe_2O_3$ | 49.15 | 863.7 | 1.9–2.0 |
| NiO | 17.5 | 144.6 | 0.35–0.36 |
| ZnO | 33.2 | 297.7 | 0.65–0.66 |

A mixture of oxides of these cations is weighed to the concentrations indicated in Table I and then placed in a steel ball mill together with 3000 cc. of distilled water, 3830 ½" steel-chrome balls, and 8720 ¼" steel-chrome balls. The mixture is milled for six hours, after which it is placed in a pan and dried in an oven at 120° C. The dried powder is crushed by a roller and passed through a 20 mesh screen. The screened powder is placed in a nickel boat prior to insertion into a furnace, in air atmosphere, which is maintained at a temperature of about 1200° C. Heating the boat and its contents for 6 hours at 1200° C. results in single phase nickel-zinc-ferrite powder as a final product. The latter is milled for 15 minutes in distilled water and wet screened through a mesh screen that can vary from 200 to 325 wires per square inch, and the screened powder is carried in a tray which is placed in an oven maintained at 120° C. until dry.

TABLE II

| | Weight (grams) | Weight (wet) percent | Weight (dry) percent |
|---|---|---|---|
| Ferrite powder (as prepared in Table I) | 453.6 | 71.38 | 83.2 |
| Silicone rubber RTV-11 | 90.7 | 14.27 | 16.6 |
| Methyl ethyl ketone | 90.7 | 14.27 | |
| Thermolite-12 | 0.45 | 0.07 | 0.2 |

Thermolite 12 is the trade name for a setting agent that is sold with the silicone rubber RTV-11 that is manufactured by the General Electric Corporation. Before the Thermolite 12 is added, the other ingredients, in the proportions shown in Table II, are mixed in any suitable mixer for about ½ hour. The resulting product is degassed in a decanter. A sufficient quantity of the degassed mixture is deposited on a 5 mil thick polyester polymeric material such as Mylar and spread uniformly by doctor blading to a thickness of about 16 mils which, upon drying, reduces to a thickness of about 8 mils. The cast sheets are dried overnight in a rack and when the dried sheets are stripped from their Mylar substrate, they are cut to size and ready to be used as keepers. The size of the ferrite powder particles embedded in the rubbery binder varies from 0.1 mil to 3.0 mil.

Another ferrite keeper is made using the particles shown in Table I but with a different binder. The binder employed is a latex comprising 20 grams of xylene, 10 grams of di-m-octylphthalate, and 20 grams of Ace plastic No. 1300 (a latex manufactured by the Ace Glass Corporation). Twenty-five grams of the zinc-nickel-ferrite of Table I are mixed with 7½ grams of the above noted latex binder. The mixture is placed into a steel vial with five steel balls ¼" in diameter and thoroughly mixed in a shaker for 10 minutes, after which it is degassed in a vacuum desiccator, then cast into a mold and the entire casting in its mold is placed in a vacuum desiccator and degassed to remove any trapped air. The casting is allowed to cure overnight at room temperature. A one hour cure at 60°–80° C. is followed by the final bake at 190° C. for 15 minutes. After curing, the mold is stripped and cut into desired sizes.

TABLE III

| | Gms. | General formula |
|---|---|---|
| $Fe_2O_3$ | 1,576 | $Fe_{1.97}Mn_{.2}Cu_{.4}Zn_{.4}Bi_{.03}O_4$ |
| $MnCO_3$ | 240 | |
| $Bi_2O_3$ | 69.9 | |
| CuO | 320 | |
| ZnO | 325 | |

The mixture of Fe, Mn, Bi, Cu and Zn salts, in the proportions shown in Table III, were milled for 4 hours in a ball mill (such balls being a mixture of ¼" and ½" balls) containing alcohol and then dried under a heat lamp. After drying, the mixture was put through a 20-mesh screen, calcined at 1050° C. for 2 hours, and then milled again for 15 minutes in alcohol. The resulting powder was dried and put through a 325-mesh screen; the 15 minute millings and subsequent screenings were repeated several times.

The resulting powder was then mixed in a binding material composed of pine oil, Estynox 408, Isochem 175A, Osochem 175B and lauric acid. The completed mixture of ferrite powder made in accordance with Table III and binder was as follows:

| | Gms. |
|---|---|
| Ferrite powder | 25.0 |
| Pine oil | 2.0 |
| Estynox 408 | 1.3 |
| Isochem 175A | 1.6 |
| Isochem 175B | 1.4 |
| Lauric acid | 0.1 |

The above mixture was mixed for 10 minutes in a shaker mill in a steel vial 1¼" in diameter and 2½" high using ten ¼" steel balls. The resulting creamy mixture was degassed in a vacuum desiccator and then cast onto a first aluminum plate. A second aluminum plate is used to cover the casting, spacers being used to determine the thickness of the mixture between the aluminum plates. The entire assembly is wrapped in aluminum foil to avoid evaporation of the solvents. Curing takes place in an oven maintained at 60°–80° C. for 8–12 hours, after which the cured casting is removed from the aluminum plates and cut to size.

The chemical nature of the resin binder is not important, rather it is the strength and flexibility which are critical. What one seeks in a binder is an electrically and magnetically neutral material, having long life, and which is flexible and rubbery where flexibility is a desired characteristic for the keeper. The proportion of binder is maintained below 16 weight percent for the most efficient keeper performance so that 84% by weight is the ferrite powder. When a stack of memory planes is used to construct a large memory block, each memory plane applies pressure on the one below itself. A rubbery or flexible resinous keeper absorbs this pressure and prevents downward pressure on the lower memory planes. Since the magnetic storage bits of the latter are stress-sensitive, such absorption of stresses by the rubbery keeper avoids degradation of the operating characteristics of the memory.

In some applications, it is desirable to have the flexible keeper of this invention be cast directly onto the drive lines made in the form of thin copper strips to be used in a memory matrix. In such instance, the word lines will consist of very thin parallel copper word lines (0.007" wide, 0.005" thick on 0.014" centers) lying on a 0.0005" thick polyimide film, the latter being kept flat on a glass substrate, with the copper strip lines faced upward. The keeper castings can then be poured over the copper strip lines and the resulting keeper is integral with the word lines that will eventually be used in a memory.

The keeper of this invention can also be employed for confining flux paths to the immediate vicinity of storage bits for coupled-film magnetic storage planes. A discussion of the operation of coupled-film memories appears in the March 1965 issue of the Journal of Applied Physics, vol. 36, No. 3 (part 2), pp. 1123–1125 in an article entitled "Wall Motion Reversal in Easy-Axis-Coupled Film Strips" by J. M. Daughton et al.

While the invention has been particularly shown and described with reference to preferred embodiments thereof, it will be understood by those skilled in the art that various changes in form and details may be made therein without departing from the spirit and scope of the invention.

What is claimed is:

1. A highly magnetically permeable, rubberlike keeper for confining the flux path of coincident current memory arrays close to the memory elements being switched comprising a ferrite powder having a low magnetic remanence whose particle sizes vary from 0.1 mil to 3 mils in diameter impregnated in a flexible resinous binder, said binder being of the order of 8–20 mils in thickness, said ferrite powder having the general formula $$Ni_xZn_yFe_{3-(x+y)}O_4$$

where $(x+y)=1$.

2. A highly magnetically permeable, rubberlike keeper for confining the flux path of coincident current memory arrays close to the memory elements being switched comprising a ferrite powder having a low magnetic remanence whose particle sizes vary from 0.1 mil to 3 mils in diameter impregnated in a flexible resinous binder, said binder being of the order of 8–20 mils in thickness, said ferrite powder having the formula $Ni_{0.35}Zn_{0.65}Fe_2O_4$.

3. A highly magnetically permeable, rubberlike keeper for confining the flux path of coincident current memory arrays close to the memory elements being switched comprising a ferrite powder having a low magnetic remanence whose particle sizes vary from 0.1 mil to 3 mils in diameter impregnated in a flexible resinous binder, said binder being of the order of 8–20 mils in thickness, said ferrite powder having the formula $$Fe_{1.97}Cu_{0.40}Zn_{0.40}Mn_{0.2}Bi_{0.03}O_4$$

4. A highly magnetically permeable, rubberlike keeper for confining the flux path of coincident current memory arrays close to the memory elements being switched comprising a ferrite powder having a low magnetic remanence whose particle sizes vary from 0.1 mil to 3 mils in diameter impregnated in a flexible resinous binder, said binder being of the order of 8–20 mils in thickness, said ferrite powder comprising 84% of the weight of the keeper and the flexible resinous binder comprising 16% of the weight of the keeper.

References Cited

UNITED STATES PATENTS

| | | | |
|---|---|---|---|
| 3,036,007 | 5/1962 | Buykx et al. | 252—62.65 |
| 3,177,145 | 4/1965 | Brownlow | 252—62.5 |

FOREIGN PATENTS

| | | |
|---|---|---|
| 2,079,363 | 3/1964 | Great Britain. |

OTHER REFERENCES

Publication I, IBM Technical Disclosure Bulletin, vol. 8, No. 10, March 1966 p. 1411.

BERNARD KONICK, Primary Examiner

S. B. POKOTILOW, Assistant Examiner

U.S. Cl. X.R.

262—62.51; 264—104; 335—303